(12) United States Patent
Xu et al.

(10) Patent No.: US 12,228,829 B2
(45) Date of Patent: Feb. 18, 2025

(54) DISPLAY SUBSTRATE AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Zhuo Xu, Beijing (CN); Yajie Bai, Beijing (CN); Xiaofeng Ma, Beijing (CN); Haigang Yang, Beijing (CN); Chen Wang, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 311 days.

(21) Appl. No.: 17/785,186

(22) PCT Filed: May 12, 2021

(86) PCT No.: PCT/CN2021/093399
§ 371 (c)(1),
(2) Date: Jun. 14, 2022

(87) PCT Pub. No.: WO2021/254042
PCT Pub. Date: Dec. 23, 2021

(65) Prior Publication Data
US 2023/0009464 A1    Jan. 12, 2023

(30) Foreign Application Priority Data
Jun. 15, 2020  (CN) .................. 202010541065.2

(51) Int. Cl.
G02F 1/1343   (2006.01)
G02F 1/1362   (2006.01)
G02F 1/1368   (2006.01)

(52) U.S. Cl.
CPC .. G02F 1/134345 (2021.01); G02F 1/136209 (2013.01); G02F 1/136213 (2013.01);
(Continued)

(58) Field of Classification Search
CPC ........ G02F 1/134345; G02F 1/136209; G02F 1/136213; G02F 1/136286; G02F 1/13439; G02F 1/1368; G02F 2201/56
See application file for complete search history.

(56) References Cited

U.S. PATENT DOCUMENTS 10,379,411 B2   8/2019   Hirata
2009/0309813 A1  12/2009  Fujita
(Continued)

FOREIGN PATENT DOCUMENTS

CN   105788470 A   7/2016
CN   106653792 A   5/2017
(Continued)

*Primary Examiner* — James A Dudek
(74) *Attorney, Agent, or Firm* — IPro, PLLC

(57) ABSTRACT

Provided is a display substrate which includes a base substrate; a plurality of rectangular pixels; at least one irregularly-shaved pixel, disposed in the irregularly-shaved display region, wherein the at least one irregularly-shaped pixel is proximal to the peripheral region relative to the rectangular pixel, and a shape of a boundary line of a side, proximal to the peripheral region, of the each irregularly-shaved pixel matches with a shape of a boundary line of the irregularly-shaved display region; and a black matrix layer.

18 Claims, 15 Drawing Sheets

(52) U.S. Cl.
CPC .... *G02F 1/136286* (2013.01); *G02F 1/13439* (2013.01); *G02F 1/1368* (2013.01); *G02F 2201/56* (2013.01)

(56) References Cited

U.S. PATENT DOCUMENTS

| | | | |
|---|---|---|---|
| 2010/0289994 A1* | 11/2010 | Nonaka | G09G 3/20 349/108 |
| 2017/0125490 A1 | 5/2017 | Li et al. | |
| 2019/0164510 A1 | 5/2019 | Fang et al. | |
| 2019/0198581 A1 | 6/2019 | Kim | |

FOREIGN PATENT DOCUMENTS

| | | | |
|---|---|---|---|
| CN | 107481623 A | 12/2017 | |
| CN | 107632443 A | 1/2018 | |
| CN | 107819020 A | 3/2018 | |
| CN | 107942565 A | 4/2018 | |
| CN | 107958918 A | 4/2018 | |
| CN | 108258018 A | 7/2018 | |
| CN | 109994515 A | 7/2019 | |
| CN | 111522170 A | 8/2020 | |

\* cited by examiner

DISPLAY SUBSTRATE AND DISPLAY DEVICE

CROSS-REFERENCE TO RELATED APPLICATION

This application is a U.S. national stage of international application No. PCT/CN2021/093399, filed on May 12, 2021, which claims priority to Chinese Patent Application No. 202010541065.2, filed on Jun. 15, 2020 and entitled "DISPLAY SUBSTRATE AND DISPLAY DEVICE," the disclosure of which is herein incorporated by reference in its entirety.

TECHNICAL FIELD

The present disclosure relates to the field of display technologies, and particularly relates to a display substrate and a display device.

BACKGROUND

With the continuous development of the display technology, users are imposing increasing requirements for irregularly-shaped display devices, wherein a display region of the irregularly-shaped display device is in a non-rectangular shape.

SUMMARY

The present disclosure provides a display substrate and a display device.

According to one aspect, a display substrate is provided. The display substrate includes:
  a base substrate, including an irregularly-shaped display region and a peripheral region surrounding the irregularly-shaped display region;
  a plurality of rectangular pixels, disposed in the irregularly-shaped display region;
  at least one irregularly-shaped pixel, disposed in the irregularly-shaped display region, wherein the at least one irregularly-shaped pixel is proximal to the peripheral region relative to the rectangular pixel, and a shape of a boundary line of a side, proximal to the peripheral region, of the each irregularly-shaped pixel matches with a shape of a boundary line of the irregularly-shaped display region; and
  a black matrix layer, disposed on a side, distal from the base substrate, of the plurality of rectangular pixels and the at least one irregularly-shaped pixel, wherein the area of an opening formed by the black matrix layer in a region where each of the rectangular pixels is disposed is larger than an area of an opening formed by the black matrix layer in a region where any of the at least one irregularly-shaped pixel is disposed.

In some embodiments, the each irregularly-shaped pixel includes a plurality of first sub-pixels, wherein at least one of the first sub-pixels is an irregularly-shaped sub-pixel; and
  for the plurality of first sub-pixels in the each irregularly-shaped pixel, areas of openings formed by the black matrix layer in regions where the second sub-pixels are respectively disposed are equal.

In some embodiments, at least part of the boundary line of the irregularly-shaped display region is an arc, and a shape of the irregularly-shaped sub-pixel is a triangle, trapezoid or pentagon; and
  a boundary line of the irregularly-shaped sub-pixel adjacent to the arc is tangential to the arc.

In some embodiments, a shape of the opening formed by the black matrix layer in a region where the each irregularly-shaped sub-pixel is disposed is the same as the shape of the irregularly-shaped sub-pixel.

In some embodiments, the plurality of first sub-pixels are arranged in a pixel row direction, or are arranged in a pixel column direction.

In some embodiments, the plurality of first sub-pixels are arranged in the pixel row direction;
  a sum of lengths of the plurality of first sub-pixels in the pixel row direction is less than or equal to a length of the rectangular pixel in the pixel row direction; and
  a length of any one of the plurality of first sub-pixels in the pixel column direction is less than or equal to a length of the rectangular pixel in the pixel column direction.

In some embodiments, in the plurality of first sub-pixels, a length of the first sub-pixel proximal to the peripheral region in the pixel row direction is greater than or equal to a length of the first sub-pixel distal from the peripheral region in the pixel row direction, and a length of the first sub-pixel proximal to the peripheral region in the pixel column direction is less than or equal to a length of the first sub-pixel distal from the peripheral region in the pixel column direction.

In some embodiments, an orthographic projection of the opening formed by the black matrix layer in the region where the each of the first sub-pixels is disposed on the base substrate is within the region where the first sub-pixel is disposed.

In some embodiments, the each of the first sub-pixels includes a pixel electrode;
  wherein an orthographic projection of the pixel electrode on the base substrate is within the orthographic projection of the opening formed by the black matrix layer in the region where the first sub-pixel is disposed on the base substrate.

In some embodiments, the pixel electrode is a hollowed-out electrode.

In some embodiments, the each irregularly-shaped sub-pixel further includes a compensation capacitor connected to the pixel electrode;
  wherein an orthographic projection of the compensation capacitor on the base substrate is within a region outside the orthographic projection of the opening formed by the black matrix layer in the region where the irregularly-shaped sub-pixel is disposed on the base substrate.

In some embodiments, the compensation capacitor includes a first electrode and a second electrode; wherein
  the first electrode and the pixel electrode are disposed in a same layer, and the second electrode and a common electrode in the irregularly-shaped sub-pixel are disposed in a same layer; or
  the first electrode and a gate electrode in the first sub-pixel are disposed in a same layer, and the second electrode and a source electrode and a drain electrode in the irregularly-shaped sub-pixel are disposed in a same layer.

In some embodiments, the first electrode and the second electrode are both non-hollowed-out plate electrodes.

In some embodiments, each of the rectangular pixels includes a plurality of second sub-pixels; wherein each of the second sub-pixels is a rectangular sub-pixel; and areas of openings formed by the black matrix layer in regions where the second sub-pixels are respectively disposed are equal.

In some embodiments, an arrangement direction of the plurality of second sub-pixels is consistent with an arrangement direction of the plurality of first sub-pixels.

In some embodiments, the display substrate further includes a signal line;
wherein the signal line is connected to each pixel in the display substrate.

In some embodiments, the signal line includes a plurality of data lines and a plurality of gate lines:
wherein each of the data lines is connected to a column of sub-pixels, and each of the gate lines is connected to a row of sub-pixels.

In some embodiments, at least one of the plurality of data lines is in a bent shape, and at least one of the column of sub-pixels connected to the bent-shaped data lines is an irregularly-shaped sub-pixel.

In some embodiments, at least one of the plurality of gate lines is in a bent shape, and at least one of the row of sub-pixels connected to the bent-shaped gate lines is an irregularly-shaped sub-pixel.

According to another aspect, a display device is provided. The display device includes a driving circuit and the display substrate according to the above aspect:
wherein the driving circuit is connected to pixels in the display substrate and configured to supply a driving signal to the pixels.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description illustrate merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

With the continuous development of the display technology, smart phone may generally employ an irregularly-shaped display substrate, and a display region of the irregularly-shaped display substrate is in a non-rectangular shape. In the related art, pixels in the irregularly-shaped display substrate are rectangular pixels that are arranged in a zigzag shape on a periphery of a display region of the irregularly-shaped display substrate. As a result, a display effect is affected.

Figure 1:
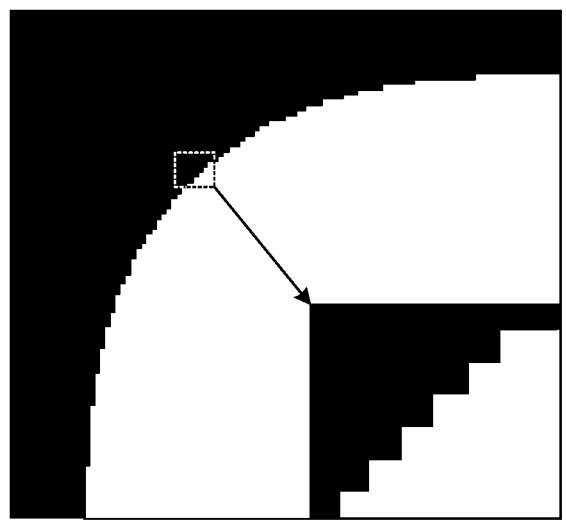
FIG. 1 is a schematic diagram of a display effect of a display device in the related art.

For example, referring to FIG. 1, assuming that the display region of the irregularly-shaped display substrate is in an arc shape, an image displayed in the irregularly-shaped display substrate is w % bite, and a peripheral region surrounding the display region in the irregularly-shaped display substrate is black, then the image displayed on a periphery of the irregularly-shaped display substrate is in a zigzag shape, and thus the display effect of the irregularly-shaped display substrate is poor.

Figure 2:
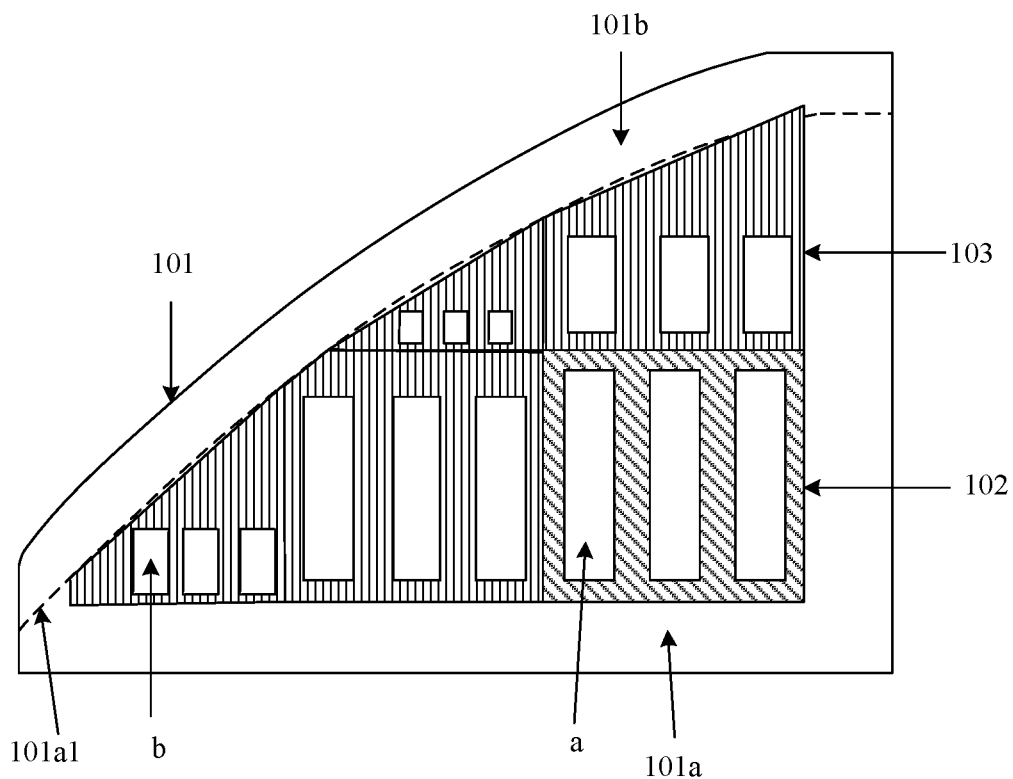
FIG. 2 is a partial structural schematic diagram of a display substrate according to an embodiment of the present disclosure.
Figure 3:
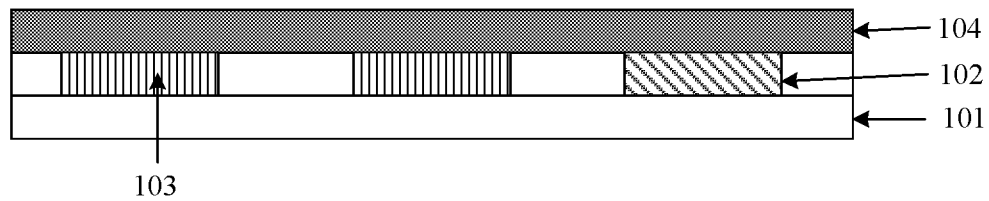
FIG. 3 is a structural schematic diagram of a display substrate according to an embodiment of the present disclosure.

FIG. 2 is a partial structural schematic diagram of a display substrate according to an embodiment of the present disclosure. Referring to FIG. 2, a display substrate 10 may include a base substrate 101, a plurality of rectangular pixels 102, and at least one irregularly-shaped pixel 103. The irregularly-shaped pixel 103 may be a pixel in a non-rectangular shape. For example, FIG. 2 illustrates one rectangular pixel 102 and four irregularly-shaped pixels 103. FIG. 3 is a structural schematic diagram of a display substrate according to an embodiment of the present disclosure. Referring to FIG. 3, a display substrate 10 further includes a black matrix layer 104.

Referring to FIG. 2, the base substrate 101 may be provided with an irregularly-shaped display region 101*a* and a peripheral region 101b surrounding the irregularly-shaped display region 101a. The plurality of rectangular pixels 102 and the at least one irregularly-shaped pixel 103 may be disposed in the irregularly-shaped display region 101a. Further, the at least one irregularly-shaped pixel 103 is proximal to the peripheral region 101b relative to the rectangular pixel 102, and a shape of a boundary line of a side, proximal to the peripheral region 101b, of each of the at least one irregularly-shaped pixel 103 matches with a shape of a boundary line 101a1 of the irregularly-shaped display region 101a.

That is, a pixel distal from the boundary line 101a1 of the irregularly-shaped display region 101a may be the rectangular pixel 102, and a pixel proximal to the boundary line 101a1 of the irregularly-shaped display region 101a may be the irregularly-shaped pixel 103. Further, a shape of the irregularly-shaped pixel 103 proximal to the boundary line 101a1 of the irregularly-shaped display region 101a matches with the shape of the boundary line 101a1 of the irregularly-shaped display region 101a, such that the irregularly-shaped pixel does not go beyond the irregularly-shaped display region of the display substrate, a narrow bezel of the display substrate may be realized conveniently, and an image displayed at the boundary line 101a1 of the irregularly-shaped display region 101a may be prevented from being in a zigzag shape. In this way, the display effect of the display device is ensured.

It is to be noted that, referring to FIG. 3, the rectangular pixel 102 and the irregularly-shaped pixel 103 may be disposed on a same side of a base substrate 101, and disposed in a same layer. For example, each film layer in the rectangular pixel 102 and a corresponding film layer in the irregularly-shaped pixel 103 may be prepared by a same patterning process.

In some embodiments of the present disclosure, referring to FIG. 3, a black matrix layer 104 may be disposed on a side, distal from the base substrate 101, of a plurality of rectangular pixels 102 and at least one irregularly-shaped pixel 103. Further, referring to FIG. 2, the black matrix layer 104 may form an opening in a region where each of the plurality of rectangular pixels 102 and at least one irregularly-shaped pixel 103 is disposed, such that light emitted by each pixel may exit from the opening, thereby realizing normal display of the display device.

Referring to FIG. 2, an area of an opening a formed by the black matrix layer 104 in a region where each rectangular pixel 102 is disposed is larger than an area of an opening b in a region where any of the at least one irregularly-shaped pixel 103 is disposed. Because an area of an orthographic projection of the irregularly-shaped pixel 103 on the base substrate 101 is smaller than an area of an orthographic projection of the rectangular pixel 102 on the base substrate 101, the area of the opening b formed by the black matrix layer 104 in the region where the irregularly-shaped pixel 103 is disposed is smaller, such that a smooth transition of luminance of light emitted by the irregularly-shaped pixel 103 and the rectangular pixel 102 is ensured, the visual comfort of the display device is better, and the luminance uniformity is better. FIG. 3 only illustrates the location of the black matrix layer 104 relative to the rectangular pixel 102 and the irregularly-shaped pixel 103, and does not illustrate the opening of the black matrix layer 104 in the rectangular pixel 102 or the irregularly-shaped pixel 103.

In summary, the embodiments of the present disclosure provide a display substrate. The display substrate includes at least one irregularly-shaped pixel. The shape of the boundary line of a side, proximal to the peripheral region, of each of the at least one irregularly-shaped pixel matches with the shape of the boundary line of the irregularly-shaped display region in the base substrate, such that the irregularly-shaped pixel does not go beyond the irregularly-shaped display region of the display substrate, a narrow bezel of the display substrate is realized conveniently, and the image displayed at the boundary line of the irregularly-shaped display region is prevented from being in a zigzag shape, thereby ensuring the display effect of the display device. Further, because the area of the orthographic projection of the irregularly-shaped pixel on the base substrate is smaller than the area of the orthographic projection of the rectangular pixel on the base substrate, the area of the opening formed by the black matrix layer in the region where each rectangular pixel is disposed is larger than the area of the opening formed by the black matrix layer in the region where any irregularly-shaped pixel is disposed, such that the smooth transition of luminance of light emitted by the irregularly-shaped pixel and the rectangular pixel is ensured, and the luminance uniformity of the display device is better.

Figure 4:
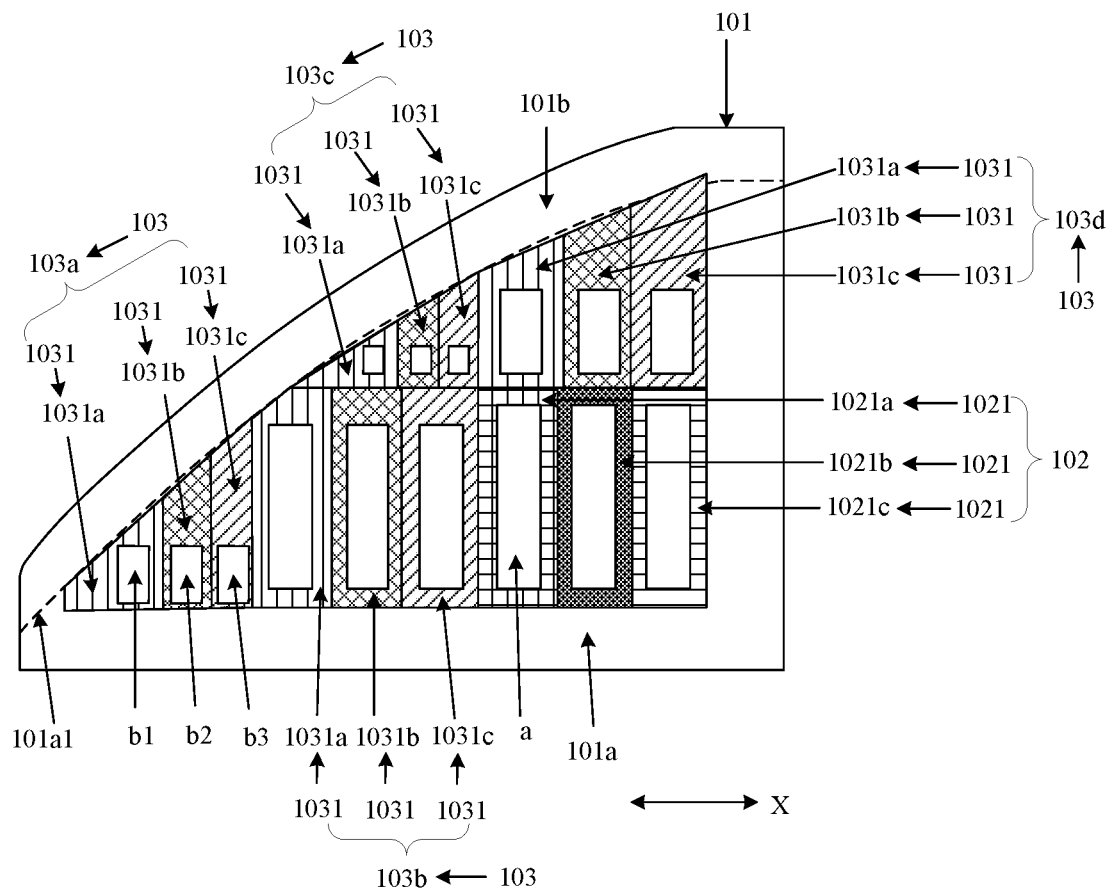
FIG. 4 is a partial structural schematic diagram of another display substrate according to an embodiment of the present disclosure.

FIG. 4 is a partial structural schematic diagram of another display substrate according to an embodiment of the present disclosure. Referring to FIG. 4, each of the at least one irregularly-shaped pixel 103 may include a plurality of first sub-pixels 1031, at least one of which is an irregularly-shaped sub-pixel.

For example, FIG. 4 illustrates four irregularly-shaped pixels 103 (103a, 103b, 103c and 103d), and each of the at least one irregularly-shaped pixel 103 includes three first sub-pixels 1031 (1031a, 1031b and 1031c). All first sub-pixels 1031 in a first irregularly-shaped pixel 103a, a third irregularly-shaped pixel 103c and a fourth irregularly-shaped pixel 103d are the irregularly-shaped sub-pixels, a first first sub-pixel 1031a in a second irregularly-shaped pixel 103b is the irregularly-shaped sub-pixel, and a second first sub-pixel 1031b and a third first sub-pixel 1031c that are in the second irregularly-shaped pixel 103b are not the irregularly-shaped sub-pixels.

In some embodiments of the present disclosure, three first sub-pixels 1031 in each of the at least one irregularly-shaped pixel 103 may be a red (R) sub-pixel 1031a, a green (G) sub-pixel 1031b and a blue (B) sub-pixel 1031c. Light emitted by the red sub-pixel 1031a is red, light emitted by the green sub-pixel 1031b is green, and light emitted by the blue sub-pixel 1031c is blue.

A shape of a boundary line of a side, proximal to a peripheral region 101b, of an irregularly-shaped pixel 103 matches with a shape of a boundary line of an irregularly-shaped display region 101a. Thus, areas of orthographic projections of a plurality of first sub-pixels 1031 in the irregularly-shaped pixel 103 on a base substrate 101 are usually unequal. As a result, the luminance of light emitted by each first sub-pixel 1031 in the irregularly-shaped pixel 103 may be inconsistent, thereby resulting in colour deviation. For example, the luminance of light emitted by the first sub-pixel 1031 with the larger area of the orthographic projection on the base substrate 101 is higher, and the luminance of light emitted by the first sub-pixel 1031 with the smaller area of the orthographic projection on the base substrate 101 is lower.

Therefore, in some embodiments of the present disclosure, for a plurality of first sub-pixels 1031 in each of the at least one irregularly-shaped pixel 103, areas of openings formed by a black matrix layer 104 in regions where the first sub-pixels 1031 are disposed are equal, such that opening ratios of the first sub-pixels 1031 are consistent, thereby realizing the consistent luminance of light emitted by each first sub-pixel 1031 and avoiding the colour deviation.

In an exemplary embodiment, referring to FIG. 4, for the three first sub-pixels 1031 in the first irregularly-shaped pixel 103a, an area of an opening b1 formed by a black matrix layer 104 in a region where the first first sub-pixel 1031a is disposed, an area of an opening b2 formed by the black matrix layer 104 in a region where the second first sub-pixel 1031b is disposed, and an area of an opening b3 formed by the black matrix layer 104 in a region where the third first sub-pixel 1031c is disposed are equal. Referring to FIG. 4, the opening b1, the opening b2 and the opening b3 are all rectangles.

Referring to FIG. 4, at least part of a boundary line of an irregularly-shaped display region 101a may be an arc, and a shape of the irregularly-shaped sub-pixel may be a triangle, trapezoid or pentagon. A boundary line of the irregularly-shaped sub-pixel adjacent to the arc is tangential to the arc. The shape of the irregularly-shaped sub-pixel may refer to a shape of an orthographic projection of the irregularly-shaped sub-pixel on the base substrate 101.

In an exemplary embodiment, referring to FIG. 4, shapes of the first first sub-pixel 1031a, the second first sub-pixel 1031b and the third first sub-pixel 1031c that are in the first irregularly-shaped pixel 103a are all trapezoids, and a bevel edge of the trapezoid is tangential to the boundary line of the irregularly-shaped display region 101a. A shape of the first first sub-pixel 1031a in the second irregularly-shaped pixel 103b is a pentagon. A target edge in the pentagon is tangential to the boundary line of the irregularly-shaped display region 101a, and an extension direction of the target edge intersects with an extension direction of any other edge in the pentagon except the target edge. A shape of the first first sub-pixel 1031a in the third irregularly-shaped pixel 103c is a triangle, and a bevel edge of the triangle is tangential to the boundary line of the irregularly-shaped display region 101a Shapes of the second first sub-pixel 1031b and the third first sub-pixel 1031c that are in the third irregularly-shaped pixel 103c are both trapezoids, and a bevel edge of the trapezoid may be tangential to the boundary line of the irregularly-shaped display region 101a. Shapes of a first first sub-pixel 1031a, a second first sub-pixel 1031b and a third first sub-pixel 1031c that are in the fourth irregularly-shaped pixel 103d are all trapezoids, and a bevel edge of the trapezoid may be tangential to the boundary line of the irregularly-shaped display region 101a.

Figure 5:
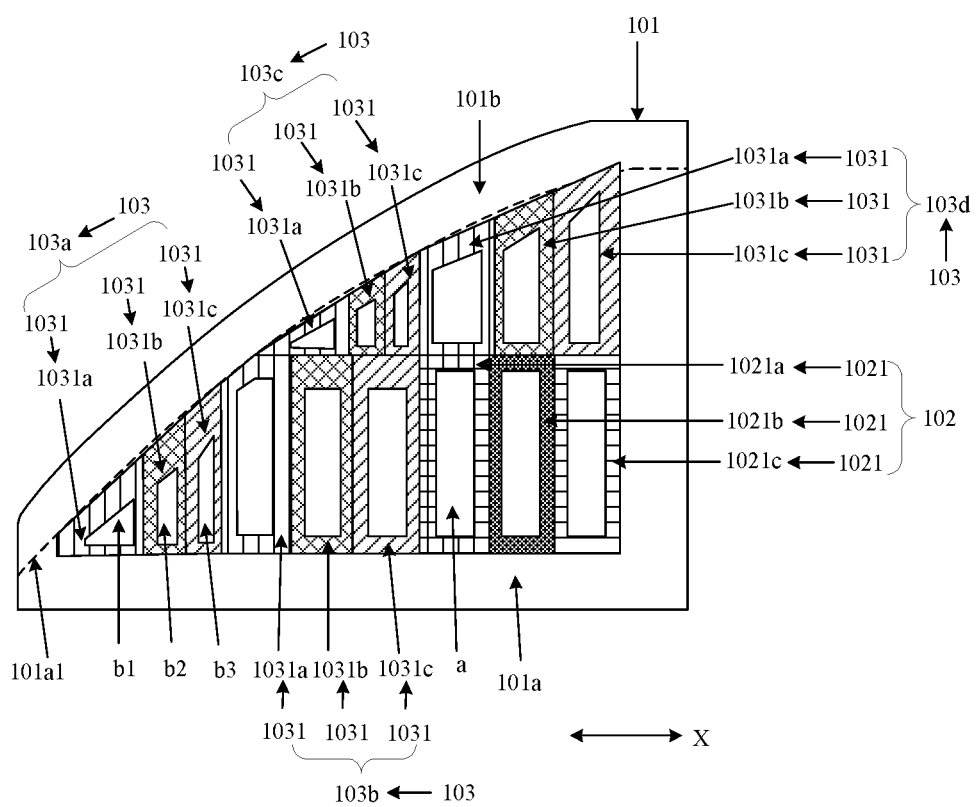
FIG. 5 is a partial structural schematic diagram of another display substrate according to an embodiment of the present disclosure.

FIG. 5 is a partial structural schematic diagram of another display substrate according to an embodiment of the present disclosure. Referring to FIG. 5, a shape of an opening formed by a black matrix layer 104 in a region where each irregularly-shaped sub-pixel is disposed may be same as the shape of the irregularly-shaped sub-pixel. For example, in the case that the shape of the irregularly-shaped sub-pixel is a triangle, the shape of the opening formed by the black matrix layer 104 in the region where the irregularly-shaped sub-pixel is disposed is also a triangle.

In some embodiments of the present disclosure, because the light emitted by each sub-pixel exits from an opening formed by the black matrix layer 104 in a region where the sub-pixel is disposed, a shape of an image displayed in a region where the sub-pixel is disposed in the display substrate 10 is the same as a shape of the opening formed by the black matrix layer 104 in the region where the sub-pixel is disposed. That is, a shape of an opening formed by the black matrix layer 104 in a region where an irregularly-shaped sub-pixel is disposed may match with the shape of the boundary line of the irregularly-shaped display region 101a, such that the shape of the image displayed in the region where the sub-pixel is disposed in the display substrate 10 matches with the shape of the boundary line of the irregularly-shaped display region 101a. Therefore, an image displayed at the boundary line of the irregularly-shaped display region 101a may be prevented from being in a zigzag shape, and the display effect of the display device is better.

Figure 6:
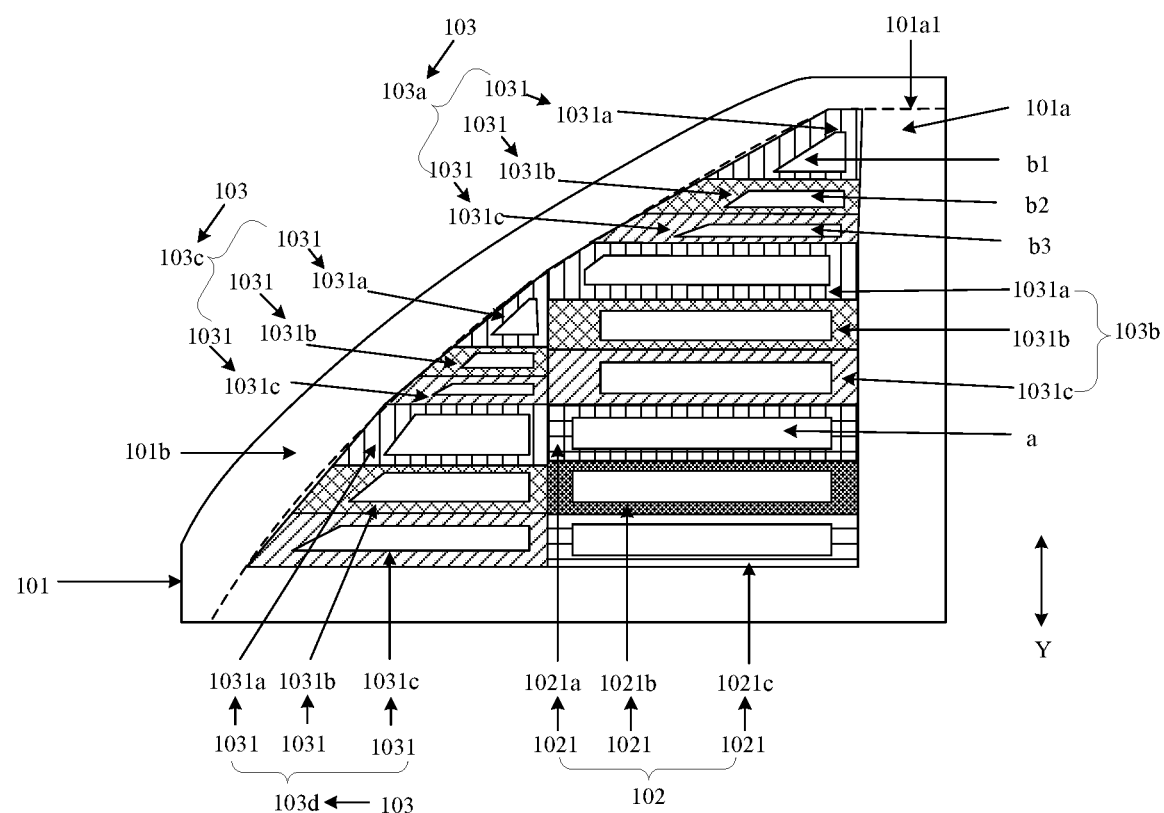
FIG. 6 is a partial structural schematic diagram of another display substrate according to an embodiment of the present disclosure.

Referring to FIG. 4 and FIG. 5, the plurality of first sub-pixels 1031 in each of the at least one irregularly-shaped pixel 103 may be arranged in a pixel row direction X. Referring to FIG. 6, a plurality of first sub-pixels 1031 in each of the at least one irregularly-shaped pixel 103 may be arranged in a pixel column direction Y, which is not limited in the embodiments of the present disclosure.

Figure 7:
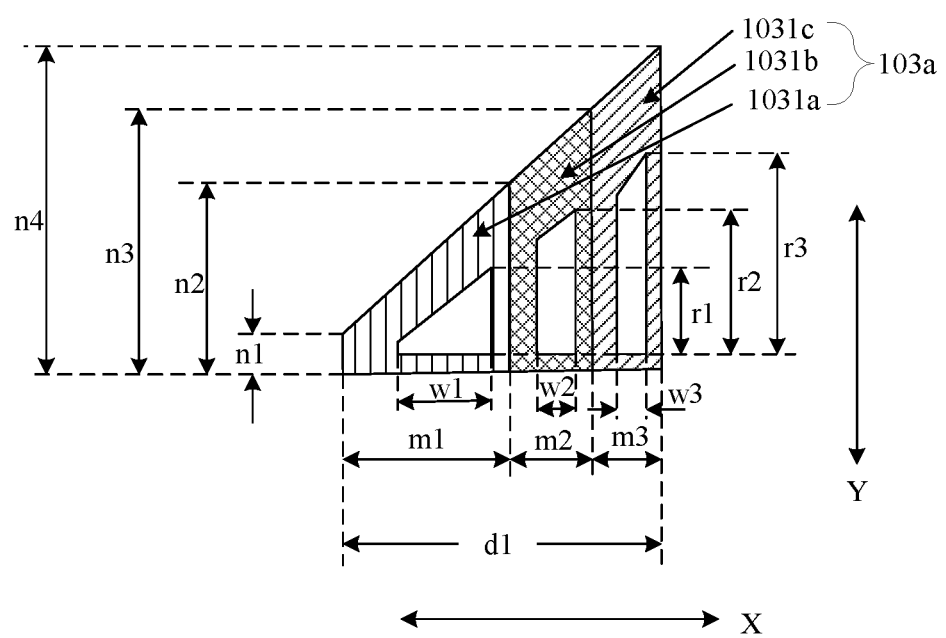
FIG. 7 is a schematic diagram of an irregularly-shaped pixel illustrated in FIG. 5.
Figure 8:
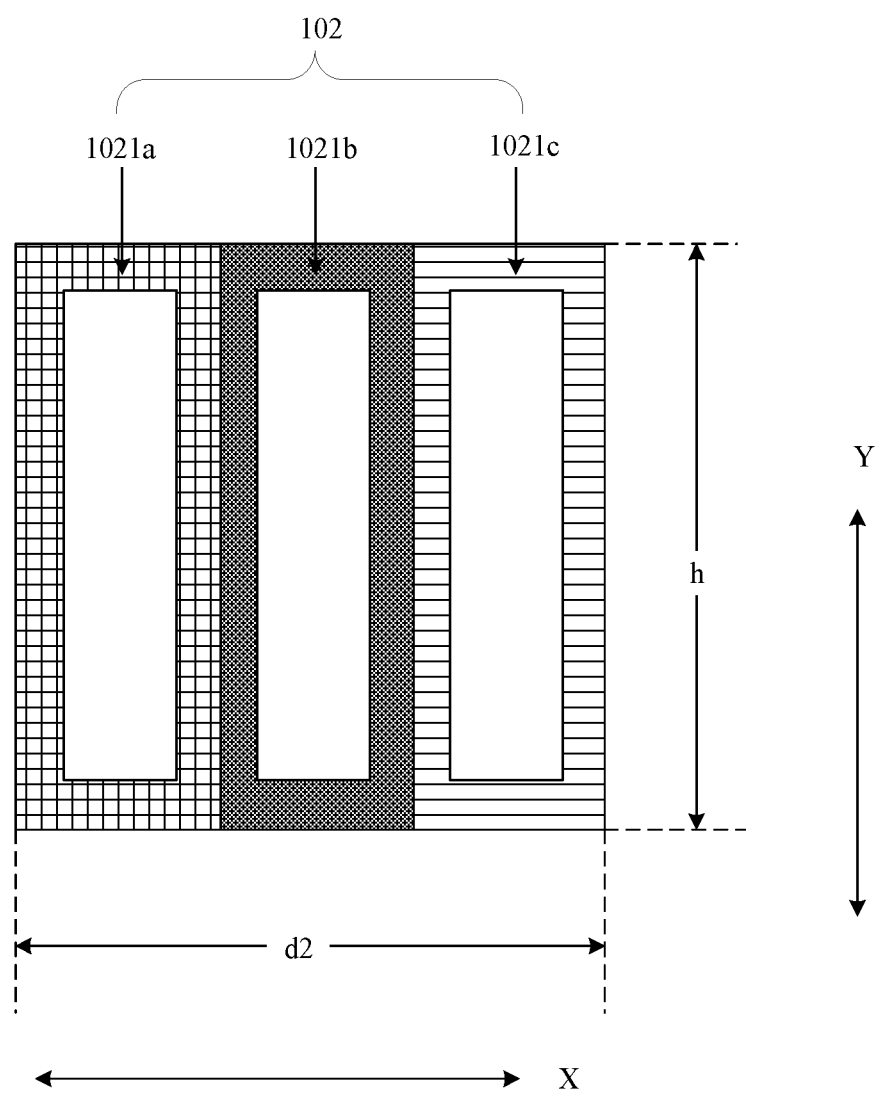
FIG. 8 is a schematic diagram of a rectangular pixel illustrated in FIG. 5.

In an optional embodiment, FIG. 7 is a schematic diagram of an irregularly-shaped pixel illustrated in FIG. 5, and FIG. 8 is a schematic diagram of a rectangular pixel illustrated in FIG. 5. Assuming that the plurality of first sub-pixels 1031 are arranged in the pixel row direction X, then referring to FIGS. 5 to 8, a sum d1 of lengths of the plurality of first sub-pixels 1031 in the pixel row direction X is less than or equal to a length d2 of a rectangular pixel 102 in the pixel row direction X, that is, d1=m1+m2+m3≤d2. A length of any one of the plurality of first sub-pixels 1031 in the pixel column direction Y is less than or equal to a length h of the rectangular pixel 102 in the pixel column direction Y. For example, referring to FIG. 7, a length n4 of a third first sub-pixel 1031c in the pixel column direction Y is less than the length h of the rectangular pixel 102 in the pixel column direction Y, that is, n4<h.

Figure 9:
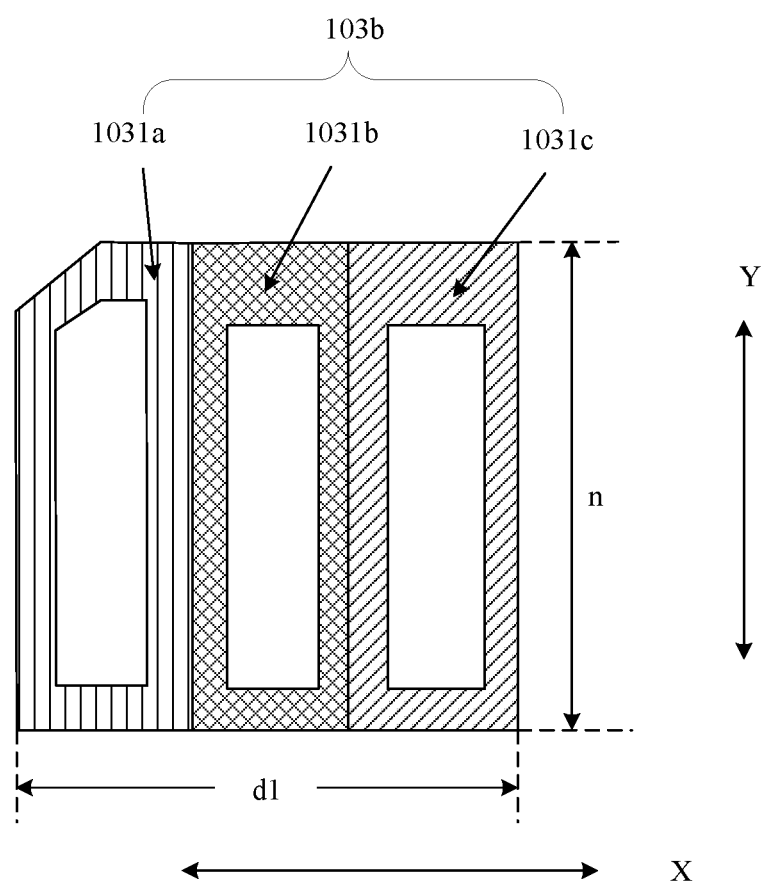
FIG. 9 is a schematic diagram of another irregularly-shaped pixel illustrated in FIG. 5.

Referring to FIG. 9, in the case that the sum d1 of lengths of the plurality of first sub-pixels 1031 in the pixel row direction X is equal to the length d2 of the rectangular pixel 102 in the pixel row direction X and the length n of each of the plurality of first sub-pixels 1031 in the pixel column direction Y is equal to the length h1 of the rectangular pixel 102 in the pixel column direction Y, that is, d1=m1+m2+m3=d2 and n=h, a shape of one first sub-pixel 1031a that is in the plurality of first sub-pixels 1031 and proximal to a peripheral region 101b may be a pentagon. A target edge in the pentagon is tangential to a boundary line of an irregularly-shaped display region 101a, and an extension direction of the target edge intersects with an extension direction of any other edge in the pentagon except the target edge.

It is to be noted that, a shape of the first sub-pixel 1031 that is in the plurality of first sub-pixels 1031 and proximal to the peripheral region 101b is more susceptible to the shape of the boundary line of the irregularly-shaped display region 101a. Therefore, the areas of the orthographic projections of the plurality of first sub-pixels 1031 on the base substrate 101 are equal to ensure the display effect of the display device. In the embodiments of the present disclosure, in the plurality of first sub-pixels 1031, a length of the first sub-pixel 1031 proximal to the peripheral region 101b in a pixel row direction X may be greater than or equal to a length of the first sub-pixel 1031 distal from the peripheral region 101b in the pixel row direction X. Further, a length of the first sub-pixel 1031 proximal to the peripheral region 101b in a pixel column direction Y may be less than or equal to a length of the first sub-pixel 1031 distal from the peripheral region 101b in the pixel column direction Y.

Thus, by increasing the length of the first sub-pixel 1031 proximal to the peripheral region 101b in the pixel row direction X, and decreasing the length of the first sub-pixel 1031 proximal to the peripheral region 101b in the pixel column direction Y, the area of the orthographic projection of the first sub-pixel 1031 proximal to the peripheral region 101*b* on the base substrate 101 is equal to the area of the orthographic projection of the first sub-pixel 1031 distal from the peripheral region 101*b* on the base substrate 101. Therefore, the black matrix layer 104 may be provided with openings with the same area in a region where the plurality of first sub-pixels 1031 are disposed to ensure the display effect of the display device.

Further, by adjusting the lengths of the first sub-pixel 1031 proximal to the peripheral region 101*b* in the pixel row direction X and in the pixel column direction Y, the shape of the first sub-pixel 1031 proximal to the peripheral region 101*b* may match with the shape of the boundary line of the irregularly-shaped display region 101*a*, thereby ensuring the display effect of the display device.

In an exemplary embodiment, referring to FIG. 7, in a first irregularly-shaped pixel 103*a*, a length m1 of the first first sub-pixel 1031*a* in the pixel row direction X is greater than a length m2 of a second first sub-pixel 1031*b* in the pixel row direction X, and the length m2 of the second first sub-pixel 1031*b* in the pixel row direction X is greater than a length m3 of the third first sub-pixel 1031*c* in the pixel row direction X. That is, m1>m2>m3.

Further, referring to FIG. 7, a shape of each of three first sub-pixels 1031 is a trapezoid. Each first sub-pixel 1031 has a first edge and a second edge that are parallel to each other, and the first edge is proximal to a peripheral region 101*b* relative to the second edge. Referring to FIG. 7, a length of the second edge of the first first sub-pixel 1031*a* is equal to a length of the first edge of the second first sub-pixel 1031*b*, and a length of the second edge of the second first sub-pixel 1031*b* is equal to a length of the first edge of the third first sub-pixel 1031*c*. Further, a length n1 of the first edge of the first first sub-pixel 1031*a* is less than the length n2 of the second edge of the first first sub-pixel 1031*a*. The length n2 of the first edge of the second first sub-pixel 1031*b* is less than the length n3 of the second edge of the second first sub-pixel 1031*b*. The length n3 of the first edge of the third first sub-pixel 1031*c* is less than a length n4 of the second edge of the third first sub-pixel 1031*c*. That is, n1<n2<n3<n4.

Since the shape of the opening formed by the black matrix layer 104 in the region where the irregularly-shaped sub-pixel is disposed matches with the shape of the boundary line of the irregularly-shaped display region 101*a*, an edge of an opening corresponding to a smaller edge in the first sub-pixel 1031 is also smaller, and an edge of an opening corresponding to a larger edge in the first sub-pixel 1031 is also larger.

In an exemplary embodiment, referring to FIG. 7, a length w1 of an opening formed by the black matrix layer 104 in a region where the first first sub-pixel 1031*a* is disposed in the pixel row direction X is greater than a length w2 of an opening formed by the black matrix layer 104 in a region where the second first sub-pixel 1031*b* is disposed in the pixel row direction X. The length w2 of the opening formed by the black matrix layer 104 in the region where the second first sub-pixel 1031*b* is disposed in the pixel row direction X is greater than a length w3 of an opening formed by the black matrix layer 104 in a region where the third first sub-pixel 1031*c* is disposed in the pixel row direction X. That is, w1>w2>w3. Further, a length r1 of an opening formed by the black matrix layer 104 in a region where the first first sub-pixel 1031*a* is disposed in the pixel column direction Y is less than a length r2 of an opening formed by the black matrix layer 104 in a region where the first second sub-pixel 1031*b* is disposed in the pixel column direction Y. The length r2 of the opening formed by the black matrix layer 104 in the region where the first second sub-pixel 1031*b* is disposed in the pixel column direction Y is less than a length r3 of an opening formed by the black matrix layer 104 in a region where the first third sub-pixel 1031*c* is disposed in the pixel column direction Y. That is, r1<r2<r3.

Figure 10:
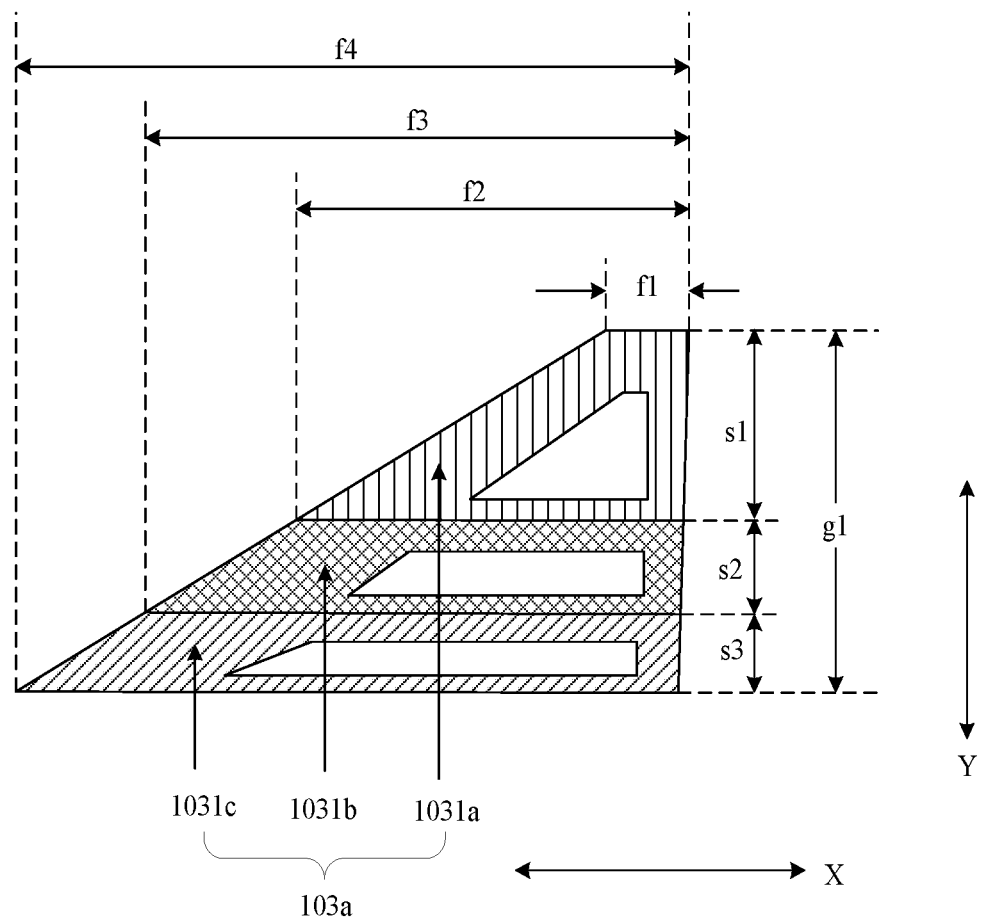
FIG. 10 is a schematic diagram of an irregularly-shaped pixel illustrated in FIG. 6.
Figure 11:
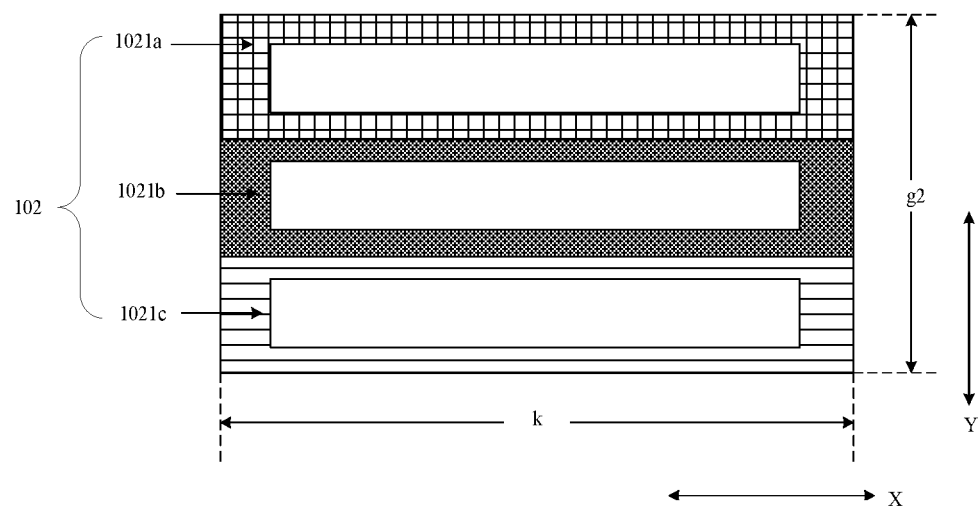
FIG. 11 is a schematic diagram of a rectangular pixel illustrated in FIG. 6.

In another optional embodiment, FIG. 10 is a schematic diagram of the irregularly-shaped pixel illustrated in FIG. 6, and FIG. 11 is a schematic diagram of the rectangular pixel illustrated in FIG. 6. Assuming that the plurality of first sub-pixels 1031 are arranged in the pixel column direction Y, then referring to FIG. 6, FIG. 10 and FIG. 11, a sum g1 of lengths of the plurality of first sub-pixels 1031 in the pixel column direction Y is less than or equal to a length g2 of the rectangular pixel 102 in the pixel column direction Y, that is, g1=s1+s2+s3≤g2. A length of any one of the plurality of first sub-pixels 1031 in a pixel row direction X is less than or equal to a length k of the rectangular pixel 102 in the pixel row direction X. For example, in FIG. 9, a length f4 of a third first sub-pixel 1031*c* in the pixel row direction X is less than the length k of the rectangular pixel 102 in the pixel row direction X, that is, f4<k.

Figure 12:
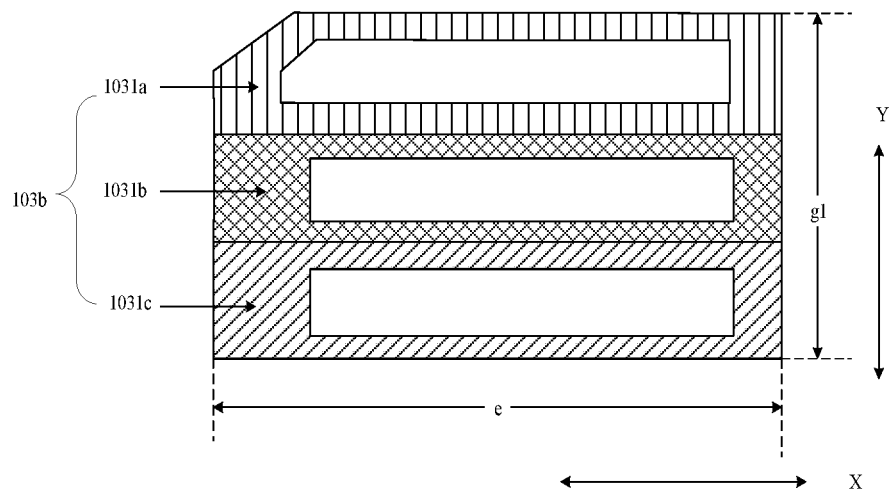
FIG. 12 is a schematic diagram of another irregularly-shaped pixel illustrated in FIG. 6.

Referring to FIG. 12, in the case that the sum g1 of lengths of the plurality of first sub-pixels 1031 in the pixel column direction Y is equal to the length g2 of the rectangular pixel 102 in the pixel column direction Y, and a length e of each of the plurality of first sub-pixels 1031 in the pixel row direction X is equal to the length k of the rectangular pixel 102 in the pixel row direction X, that is, g1=s1+s2+s3=g2 and e=k, a shape of one first sub-pixel that is in the plurality of first sub-pixels 1031 and proximal to a peripheral region 101*b* may be a pentagon. A target edge in the pentagon is tangential to a boundary line of an irregularly-shaped display region 101*a*, and an extension direction of the target edge intersects with an extension direction of any other edge in the pentagon except the target edge.

It is to be noted that, the shape of the first sub-pixel 1031 that is in the plurality of first sub-pixels 1031 and proximal to the peripheral region 101*b* is more susceptible to the shape of the boundary line of the irregularly-shaped display region 101*a*. Therefore, the area of the orthographic projection of each of the plurality of first sub-pixels 1031 on the base substrate 101 is equal to ensure the display effect of the display device. In the embodiments of the present disclosure, in the plurality of first sub-pixels 1031, the length of the first sub-pixel 1031 proximal to the peripheral region 101*b* in the pixel column direction Y may be greater than or equal to the length of the first sub-pixel 1031 distal from the peripheral region 101*b* in the pixel column direction Y. Further, the length of the first sub-pixel 1031 proximal to the peripheral region 101*b* in the pixel row direction X may be less than or equal to the length of the first sub-pixel 1031 distal from the peripheral region 101*b* in the pixel row direction X.

Thus, by decreasing the length of the first sub-pixel 1031 proximal to the peripheral region 101*b* in the pixel row direction X, and increasing the length of the first sub-pixel 1031 proximal to the peripheral region 101*b* in the pixel column direction Y, the area of the orthographic projection of the first sub-pixel 1031 proximal to the peripheral region 101*b* on the base substrate 101 is equal to the area of the orthographic projection of the first sub-pixel 1031 distal from the peripheral region 101*b* on the base substrate 101. Therefore, the black matrix layer 104 may be provided with openings with the same area in the region where a plurality of first sub-pixels 1031 are disposed to ensure the display effect of the display device.

Further, by adjusting the lengths of the first sub-pixel 1031 proximal to the peripheral region 101b in the pixel row direction X and in the pixel column direction Y, the shape of the first sub-pixel 1031 proximal to the peripheral region 101b may match with the shape of the boundary line of the irregularly-shaped display region 101a, thereby ensuring the display effect of the display device.

In an exemplary embodiment, referring to FIG. 10, in a first irregularly-shaped pixel 103a, a length s1 of a first first sub-pixel 1031a in the pixel column direction Y is greater than a length s2 of a second first sub-pixel 1031b in the pixel column direction Y, and the length s2 of the second first sub-pixel 1031b in the pixel column direction Y is greater than a length s3 of the third first sub-pixel 1031c in the pixel column direction Y. That is, s1>s2>s3.

Further, referring to FIG. 10, a shape of each of three first sub-pixels 1031 is a trapezoid. Each first sub-pixel 1031 has a first edge and a second edge that are parallel to each other, and the first edge is proximal to the peripheral region 101b relative to the second edge. Referring to FIG. 10, a length of the second edge of the first first sub-pixel 1031a is equal to a length of the first edge of the second first sub-pixel 1031b, and a length of the second edge of the second first sub-pixel 1031b is equal to a length of the first edge of the third first sub-pixel 1031c. Further, a length f1 of the first edge of the first first sub-pixel 1031a is less than a length f2 of the second edge of the first first sub-pixel 1031a. A length f2 of the first edge of the second first sub-pixel 1031b is less than a length f3 of the second edge of the second first sub-pixel 1031b. A length 13 of the first edge of the third first sub-pixel 1031c is less than a length f4 of the second edge of the third first sub-pixel 1031c. That is, f1<f2<f3<f4.

In some embodiments of the present disclosure, the orthographic projection of the opening formed by the black matrix layer 104 in the region where each first sub-pixel 1031 is disposed on the base substrate 101 is disposed in the region where the first sub-pixel 1031 is disposed. The orthographic projection of the opening formed by the black matrix layer 104 in the region where the first sub-pixel 1031 is disposed on the base substrate 101 is an opening region of the first sub-pixel 1031. Further, the light emitted by the first sub-pixel 1031 may exit from the opening region.

Figure 13:
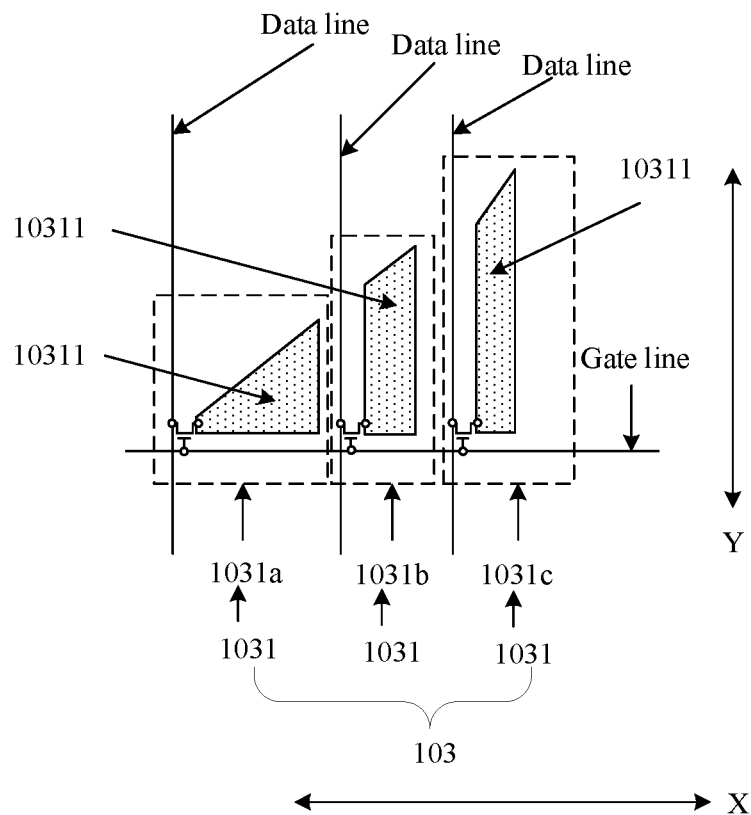
FIG. 13 is a structural schematic diagram of an irregularly-shaped pixel according to an embodiment of the present disclosure.

FIG. 13 is a structural schematic diagram of an irregularly-shaped pixel according to an embodiment of the present disclosure. Referring to FIG. 13, each irregularly-shaped sub-pixel 1031 may include a pixel electrode 10311. An orthographic projection of the pixel electrode 10311 on a base substrate 101 may be disposed in the orthographic projection of the opening formed by the black matrix layer 104 in the region where the irregularly-shaped sub-pixel 1031 is disposed on the base substrate 101. Optionally, the pixel electrode 10311 may be a hollowed-out electrode.

Figure 14:
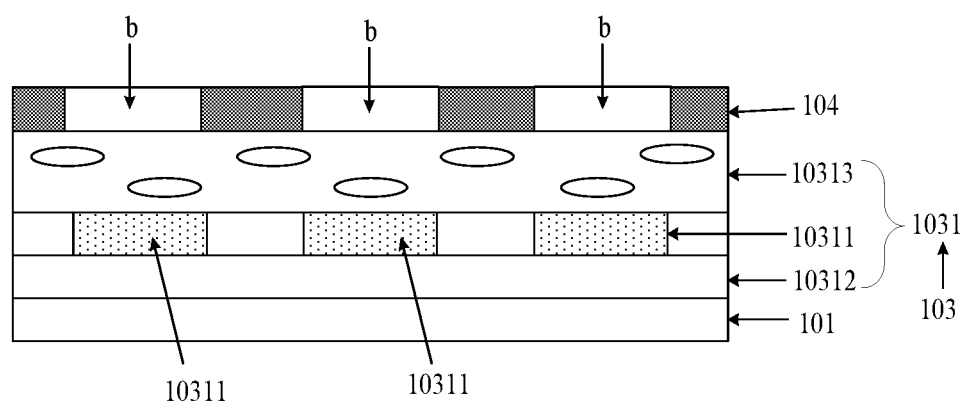
FIG. 14 is a schematic diagram of an irregularly-shaped pixel and a black matrix layer according to an embodiment of the present disclosure.

In an exemplary embodiment, FIG. 13 illustrates three irregularly-shaped sub-pixels 1031. Referring to FIG. 14, a black matrix layer 104 may have three openings b, and an orthographic projection of a pixel electrode 10311 in each irregularly-shaped sub-pixel 1031 on a base substrate 101 is disposed in an orthographic projection of the opening b on the base substrate 101.

Optionally, a shape of the pixel electrode 10311 may be same as the shape of the opening formed by the black matrix layer 104 in the region where the first sub-pixel 1031 is disposed. In an exemplary embodiment, referring to FIG. 7 and FIG. 13, the shape of the opening formed by the black matrix layer 104 in the region where the first sub-pixel 1031 is disposed is a trapezoid, and the shape of the pixel electrode 10311 is also a trapezoid.

In some embodiments of the present disclosure, referring to FIG. 14, each irregularly-shaped sub-pixel 1031 may further include a common electrode 10312 and a liquid crystal layer 10313. A pixel electrode 10311, the common electrode 10312, and the liquid crystal layer 10313 may be disposed on the same side of a base substrate 101. The common electrode 10312 and the pixel electrode 10311 may be configured to drive liquid crystals in a liquid crystal layer 10313 to deflect.

In an exemplary embodiment, referring to FIG. 14, the common electrode 10312 may be disposed on a side of the base substrate 101, the pixel electrode 10311 may be disposed on a side, distal from the base substrate 101, of the common electrode 10312, and the liquid crystal layer 10313 may be disposed on a side, distal from the common electrode 10312, of the pixel electrode 10311. Optionally, the pixel electrode 10311 may be disposed on a side of the base substrate 101, the common electrode 10312 may be disposed on a side, distal from the base substrate 101, of the pixel electrode 10311, and the liquid crystal layer 10313 may be disposed on a side, distal from the base substrate 101, of the common electrode 10312. Optionally, the pixel electrode 10311 may be disposed on a side of the base substrate 101, the liquid crystal layer 10313 maybe disposed on a side, distal from the base substrate 101, of the pixel electrode 10311, and the common electrode 10312 may be disposed on a side, distal from the base substrate 101 of the liquid crystal layer 10313.

Figure 15:
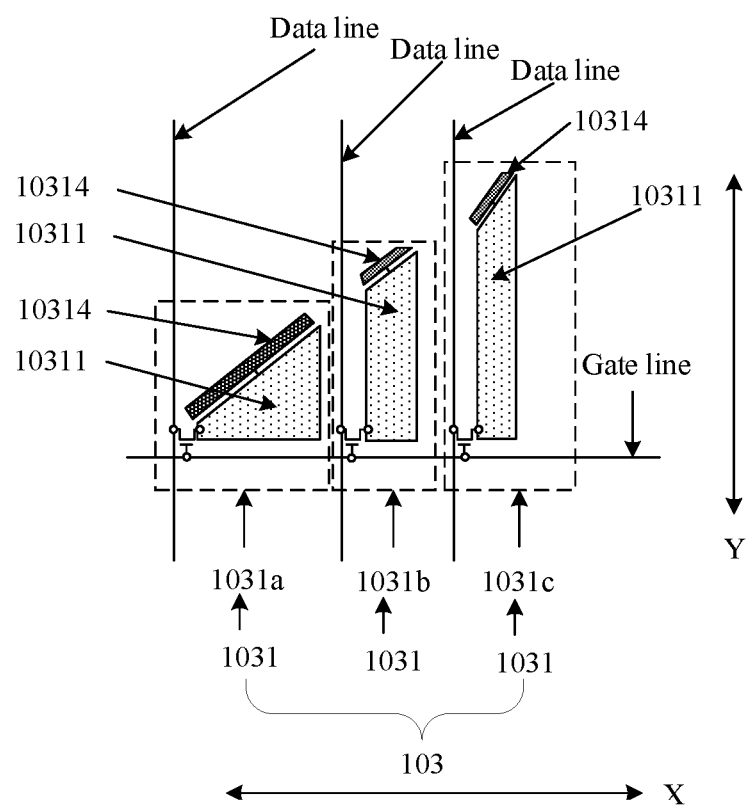
FIG. 15 is a structural schematic diagram of another irregularly-shaped pixel according to an embodiment of the present disclosure.

FIG. 15 is a structural schematic diagram of another irregularly-shaped pixel according to an embodiment of the present disclosure. Referring to FIG. 15, each irregularly-shaped sub-pixel 1031 may include a compensation capacitor 10314 connected to a pixel electrode 10311, and an orthographic projection of the compensation capacitor 10314 on a base substrate 101 is disposed in a region outside an orthographic projection of an opening formed by a black matrix layer 104 in a region where the irregularly-shaped sub-pixel 1031 is disposed on the base substrate 101. A shape of the compensation capacitor 10314 illustrated in FIG. 15 does not represent the actual shape of the compensation capacitor 10314, and the compensation capacitor 10314 may actually be in any shape, as long as the orthographic projection of the compensation capacitor 10314 on the base substrate 101 is not overlapped with an orthographic projection of the pixel electrode 10311 on the base substrate 101.

Because an area of an orthographic projection of the pixel electrode 10311 on the base substrate 101 is smaller than an area of an orthographic projection of the pixel electrode in another sub-pixel (e.g., a rectangular sub-pixel) on the base substrate 101, a storage capacitance of the irregularly-shaped sub-pixel 10311 may be smaller than that of another sub-pixel. In some embodiments of the present disclosure, a compensation capacitor 10314 connected to the pixel electrode 10311 is disposed in the irregularly-shaped sub-pixel 1031 to reduce a difference of storage capacitance between the irregularly-shaped sub-pixel 1031 and another sub-pixel, thereby reducing a charging difference between the irregularly-shaped sub-pixel 1031 and the rectangular sub-pixel.

In some embodiments of the present disclosure, the compensation capacitor 10314 may include a first electrode and a second electrode. The first electrode may be disposed in a same layer as the pixel electrode 10311, and the second electrode may be disposed in a same layer as the common electrode 10312 in the irregularly-shaped sub-pixel 1031. A passivation layer (PVX) may be disposed between the first electrode and the second electrode. Optionally, the first electrode may be disposed in the same layer as a gate electrode in the first sub-pixel 1031, and the second electrode may be disposed in the same layer as a source electrode and a drain electrode in the irregularly-shaped sub-pixel 1031. A gate insulator (GI) may be disposed between the first electrode and the second electrode.

The first electrode and the second electrode may be non-hollowed-out plate electrodes. In the case that the storage capacitance of the irregularly-shaped sub-pixel 1031 is consistent with that of another sub-pixel, a wider bezel of the display device resulted from a larger space occupied by the first electrode and the second electrode may be avoided, and a screen-to-body ratio of the display device may not be affected.

Referring to FIGS. 4 to 6, FIG. 8 and FIG. 11, each rectangular pixel 102 may include a plurality of second sub-pixels 1021. For example, the rectangular pixel 102 in FIGS. 4 to 6. FIG. 8 and FIG. 11 includes three second sub-pixels 1021, i.e., a first second sub-pixel 1021a, a second second sub-pixel 1021b and a third second sub-pixel 1021c. Each second sub-pixel 1021 may be a rectangular sub-pixel. Further, to ensure the consistent luminance of light emitted by each second sub-pixel 1021, an area of an opening formed by the black matrix layer 104 in a region where each second sub-pixel 1021 is disposed may be equal.

Optionally, a shape of an opening formed by the black matrix layer 104 in the region where each second sub-pixel 1021 is disposed may be same as a shape of the second sub-pixel 1021. That is, the opening formed by the black matrix layer 104 in the region where each second sub-pixel 1021 is disposed is a rectangle.

In some embodiments of the present disclosure, an arrangement direction of a plurality of second sub-pixels 1021 may be same that of the plurality of first sub-pixels 1031. For example, referring to FIG. 4 and FIG. 5, in the case that an arrangement direction of the plurality of first sub-pixels 1031 is the pixel row direction X, an arrangement direction of a plurality of second sub-pixels 1021 may also be the pixel row direction X. Referring to FIG. 6, in the case that an arrangement direction of the plurality of first sub-pixels 1031 is the pixel column direction Y, the arrangement direction of a plurality of second sub-pixels 1021 may also be the pixel column direction Y.

Figure 16:
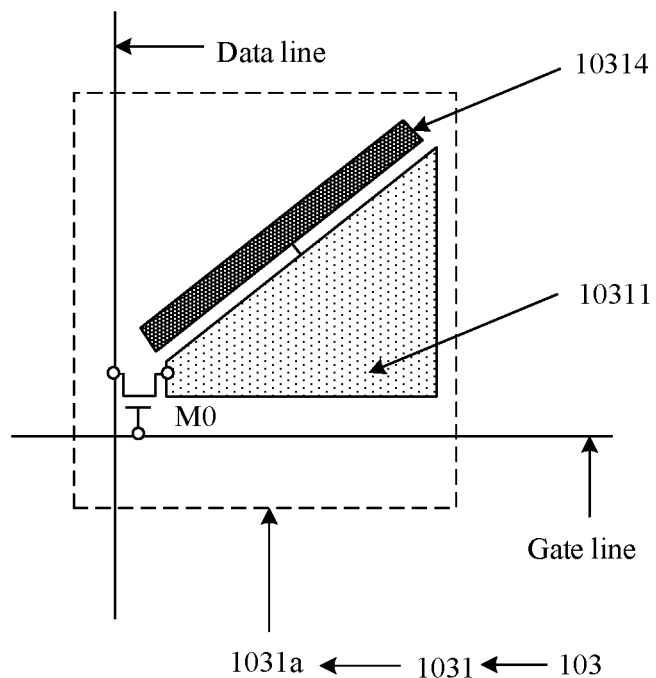
FIG. 16 is a partial structural schematic diagram of the irregularly-shaped pixel illustrated in FIG. 15.

FIG. 16 is a partial structural schematic diagram of the irregularly-shaped pixel illustrated in FIG. 15. Referring to FIG. 16, an irregularly-shaped pixel 103 may further include a transistor M0. A gate electrode of the transistor M0 may be connected to a gate line, a source electrode of the transistor M0 may be connected to a data line, and a drain electrode of the transistor M0 may be connected to the pixel electrode 10311.

Figure 17:
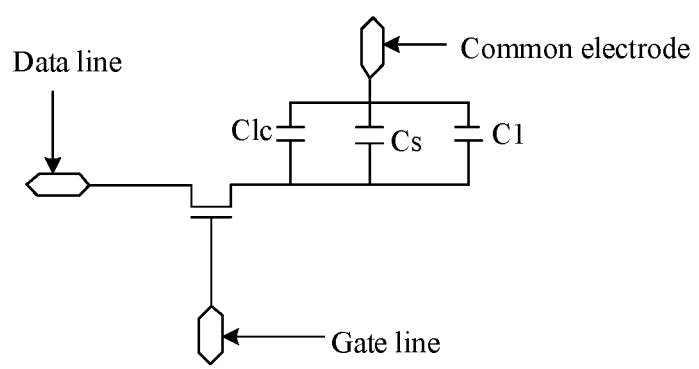
FIG. 17 is a schematic diagram of a transistor and a common electrode according to an embodiment of the present disclosure.

FIG. 17 is a schematic diagram of a transistor and a common electrode according to an embodiment of the present disclosure. Referring to FIG. 17, a capacitor in a display substrate 10 may include a storage capacitor Cs defined by a trace of the pixel electrode 10311 and a trace of a common electrode 10312, a compensation capacitor C1 defined by a first electrode and a second electrode, and a liquid crystal capacitor C1c defined by the pixel electrode 10311 and the common electrode 10312.

Figure 18:
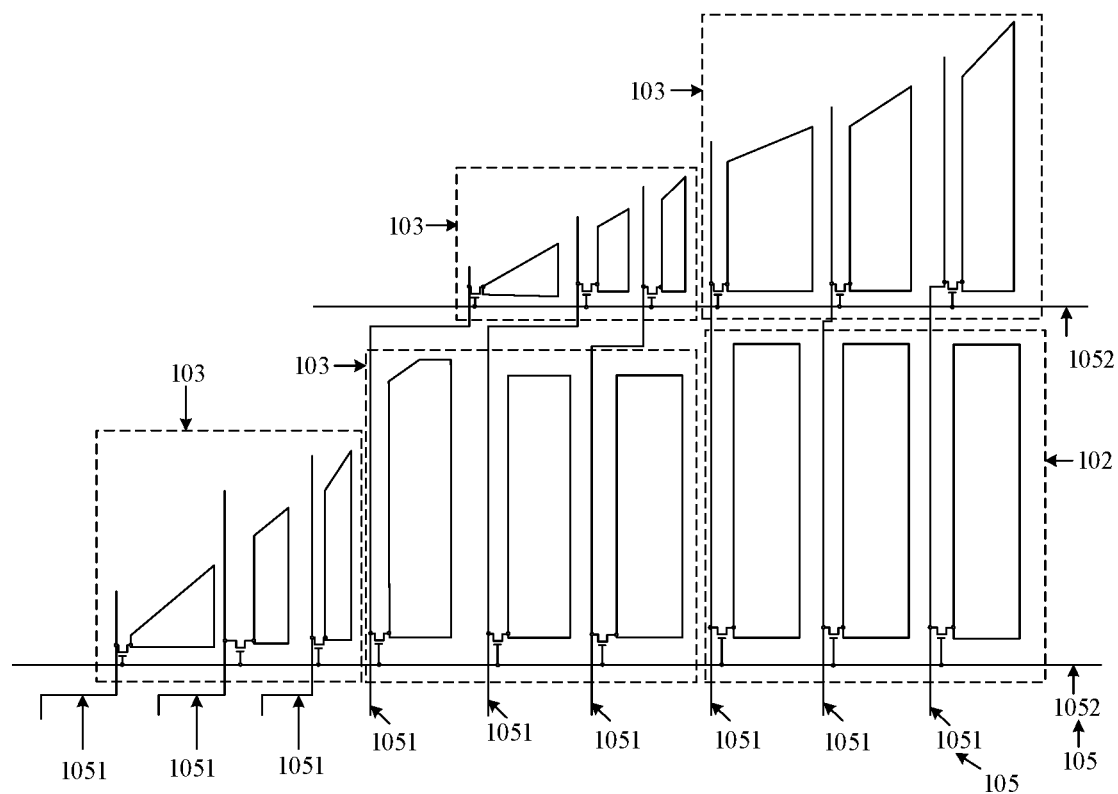
FIG. 18 is a partial structural schematic diagram of another display substrate according to an embodiment of the present disclosure.

FIG. 18 is a partial structural schematic diagram of another display substrate according to an embodiment of the present disclosure. Referring to FIG. 18, a display substrate 10 may further include a signal line 105. The signal line 105 may be connected to each pixel in the display substrate 10. For example, referring to FIG. 18, the signal line 15 may be connected to each rectangular pixel 102 and each of the at least one irregularly-shaped pixel 103 in the display substrate 10.

Referring to FIG. 18, the signal line 105 may include a plurality of data lines 1051 and a plurality of gate lines 1052. FIG. 18 illustrates nine data lines 1051 and two gate lines 1052. Each data line 1051 may be connected to a column of sub-pixels, and each gate line 1052 may be connected to a row of sub-pixels.

In a possible circumstance, referring to FIG. 18, a plurality of sub-pixels in each pixel are all arranged in a pixel row direction X. Since a length of the irregularly-shaped pixel 103 in the pixel row direction X is different from a length of the rectangular pixel 102 in the pixel row direction X, at least one of the plurality of data lines 1051 may be in a bent shape to connect the data lines 1051 to the first sub-pixel 1031 in the irregularly-shaped pixel 103 and the second sub-pixel 1021 in the rectangular pixel 102. Further, at least one of the column of sub-pixels connected to the bent-shaped data lines 1051 is an irregularly-shaped sub-pixel.

Figure 19:
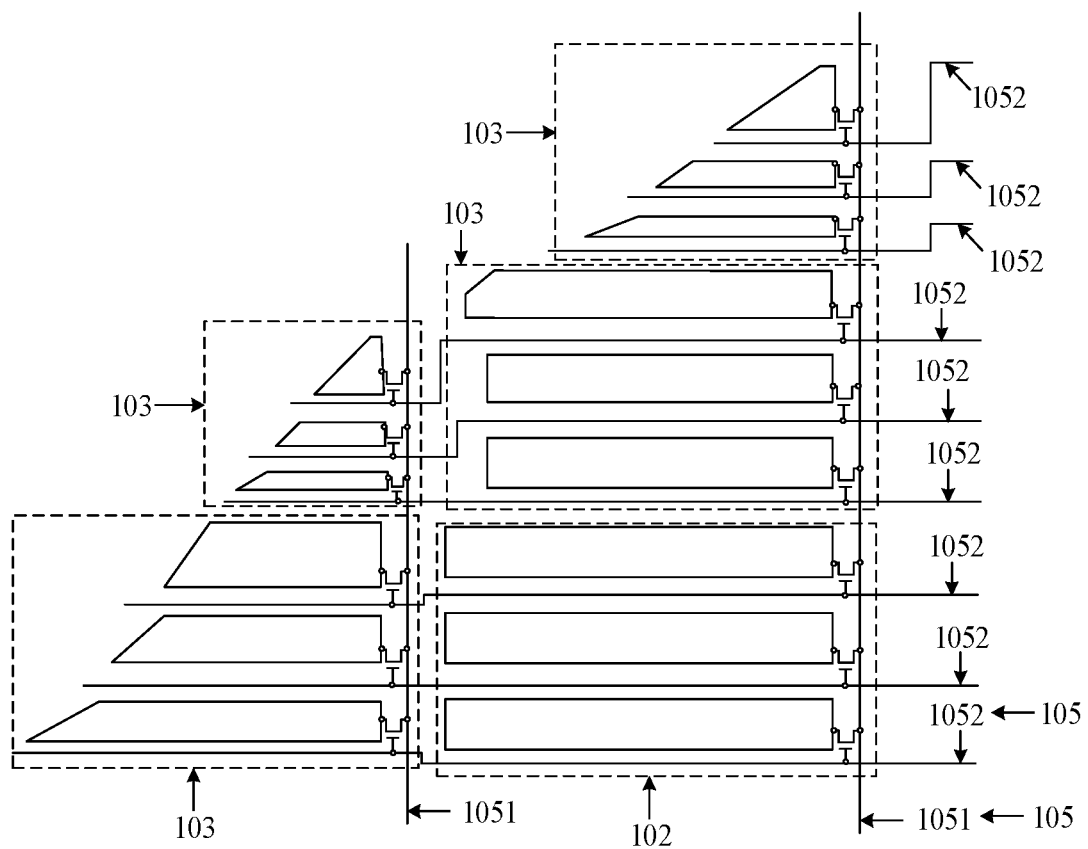
FIG. 19 is a partial structural schematic diagram of another display substrate according to an embodiment of the present disclosure.

In another possible circumstance, referring to FIG. 19, a plurality of sub-pixels in each pixel are all arranged in a pixel column direction Y. Because a length of the irregularly-shaped pixel 103 in the pixel column direction Y is different from a length of a rectangular pixel 102 in the pixel column direction Y, at least one of a plurality of gate lines 1052 may be in a bent shape to connect the gate lines 1052 to a first sub-pixel 1031 in the irregularly-shaped pixel 103 and a second sub-pixel 1021 in the rectangular pixel 102. Further, at least one of a row of sub-pixels connected to the bent-shaped gate lines 1052 is an irregularly-shaped sub-pixel. FIG. 19 illustrates two data lines 1051 and nine gate lines 1052.

In summary, the embodiments of the present disclosure provide a display substrate. The display substrate includes at least one irregularly-shaped pixel. The shape of each of the at least one irregularly-shaped pixel proximal to the boundary line of a side of the peripheral region matches with the shape of the boundary line of the irregularly-shaped display region in the base substrate, such that the irregularly-shaped pixel does not go beyond the irregularly-shaped display region of the display substrate, a narrow bezel of the display substrate is realized conveniently, and the image displayed at the boundary line of the irregularly-shaped display region is prevented from being in a zigzag shape, thereby ensuring the display effect of the display device. Further, because the area of the orthographic projection of the irregularly-shaped pixel on the base substrate is smaller than the area of the orthographic projection of the rectangular pixel on the base substrate, the area of the opening formed by the black matrix layer in the region where each rectangular pixel is disposed is larger than the area of the opening formed in the region where any irregularly-shaped pixel is disposed, such that the smooth transition of luminance of light emitted by the irregularly-shaped pixel and the rectangular pixel is ensured, and the luminance uniformity of the display device is better.

Figure 20:
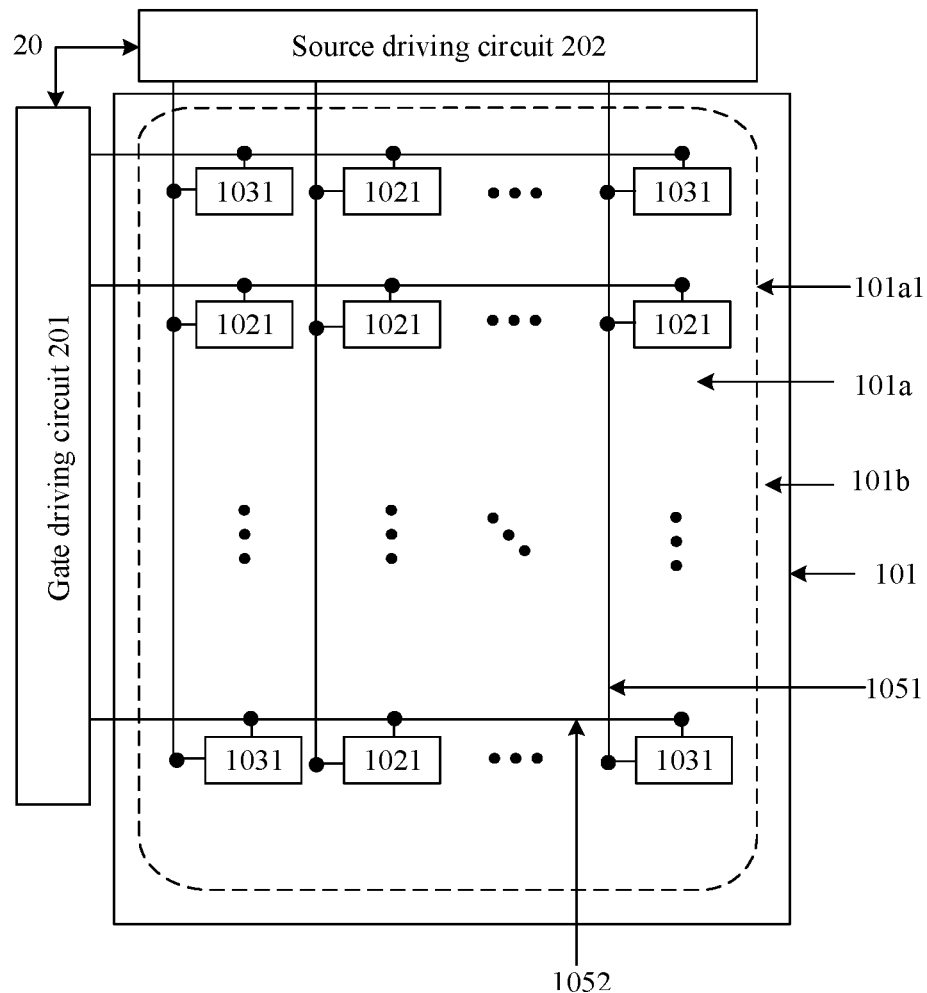
FIG. 20 is a structural schematic diagram of a display device according to an embodiment of the present disclosure.

FIG. 20 is a structural schematic diagram of a display device according to an embodiment of the present disclosure. Referring to FIG. 20, the display device may further include a driving circuit 20 and the display substrate 10 according to the above embodiment. The driving circuit 20 may be connected to pixels (a rectangular pixel 102 and an irregularly-shaped pixel 103) in the display substrate to provide a driving signal for the pixels.

Referring to FIG. 20, the driving circuit 20 may include a gate driving circuit 201 and a source driving circuit 202.

The gate driving circuit 201 may be connected to each gate line 1052 to provide a gate driving signal for each gate line 1052. Each gate line 1052 may be connected to a row of sub-pixels. The source driving circuit 202 may be connected to each data line 1051 to provide a data signal for each data line 1051. Each data line 1051 may be connected to a column of sub-pixels.

Figure 21:
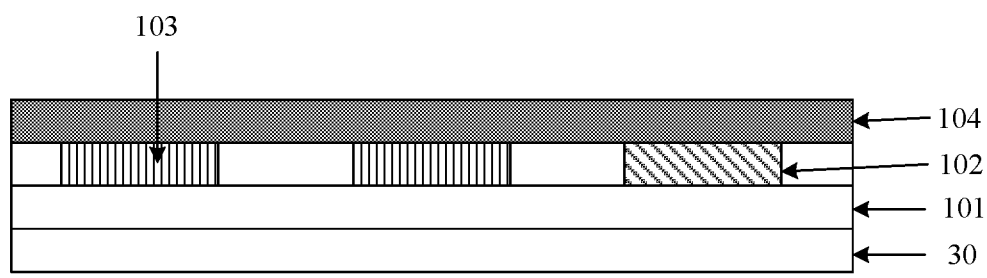
FIG. 21 is a structural schematic diagram of another display device according to an embodiment of the present disclosure.

FIG. 21 is a structural schematic diagram of another display device according to an embodiment of the present disclosure. Referring to FIG. 21, the display device may include a backlight source 30. The backlight source 30 may be disposed on a side, distal from a rectangular pixel 102 and an irregularly-shaped pixel 103, of a base substrate 101. The backlight source 30 may be configured to provide backlight for the display substrate 10.

It is to be noted that, the partial schematic diagrams of FIG. 18 and FIG. 19 are both the schematic diagrams of the upper left corner of the display substrate in the display device in FIG. 20. Referring to FIG. 20, boundary lines of an upper right corner, a lower left corner and a lower right corner of the irregularly-shaped display region of the display substrate 10 in the display device are all arcs. Therefore, the schematic diagram of the upper right corner, the lower left corner and the lower right corner of the display substrate may refer to FIG. 18 and FIG. 19, and is not repeated in the embodiments of the present disclosure.

Optionally, the display device may be any product or component with a display function, such as a liquid crystal display device, electronic paper, a mobile phone, a tablet computer, a television, a monitor, a laptop, a digital photo frame or a navigator.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A display substrate, comprising:
a base substrate, comprising an irregularly-shaped display region and a peripheral region surrounding the irregularly-shaped display region;
a plurality of rectangular pixels, disposed in the irregularly-shaped display region;
at least one irregularly-shaped pixel, disposed in the irregularly-shaped display region, wherein the at least one irregularly-shaped pixel is proximal to the peripheral region relative to the rectangular pixel, and a shape of a boundary line of a side, proximal to the peripheral region, of the each irregularly-shaped pixel matches with a shape of a boundary line of the irregularly-shaped display region; and
a black matrix layer, disposed on a side, distal from the base substrate, of the plurality of rectangular pixels and the at least one irregularly-shaped pixel, wherein an area of an opening formed by the black matrix layer in a region where each of the rectangular pixels is disposed is larger than an area of an opening formed by the black matrix layer in a region where any of the at least one irregularly-shaped pixel is disposed,
wherein the each irregularly-shaped pixel comprises a plurality of first sub-pixels, at least one of the first sub-pixels is an irregularly-shaped sub-pixel;
each irregularly-shaped sub-pixel comprises a pixel electrode and a compensation capacitor connected to the pixel electrode;
an orthographic projection of the pixel electrode on the base substrate is within an orthographic projection of the opening formed by the black matrix layer in the region where the first sub-pixel is disposed on the base substrate; and
an orthographic projection of the compensation capacitor on the base substrate is within a region outside the orthographic projection of the opening formed by the black matrix layer in the region where the irregularly-shaped sub-pixel is disposed on the base substrate, and is not overlapped with the orthographic projection of the pixel electrode on the base substrate.

2. The display substrate according to claim 1, wherein for the plurality of first sub-pixels in the each irregularly-shaped pixel, areas of openings formed by the black matrix layer in regions where the second sub-pixels are respectively disposed are equal.

3. The display substrate according to claim 2, wherein at least part of the boundary line of the irregularly-shaped display region is an arc, and a shape of the irregularly-shaped sub-pixel is a triangle, trapezoid or pentagon; and
a boundary line of the irregularly-shaped sub-pixel adjacent to the arc is tangential to the arc.

4. The display substrate according to claim 3, wherein a shape of the opening formed by the black matrix layer in a region where the each irregularly-shaped sub-pixel is disposed is the same as the shape of the irregularly-shaped sub-pixel.

5. The display substrate according to claim 2, wherein the plurality of first sub-pixels are arranged in a pixel row direction, or are arranged in a pixel column direction.

6. The display substrate according to claim 5, wherein the plurality of first sub-pixels are arranged in the pixel row direction;
a sum of lengths of the plurality of first sub-pixels in the pixel row direction is less than or equal to a length of the rectangular pixel in the pixel row direction; and
a length of any one of the plurality of first sub-pixels in the pixel column direction is less than or equal to a length of the rectangular pixel in the pixel column direction.

7. The display substrate according to claim 2, wherein in the plurality of first sub-pixels, a length of the first sub-pixel proximal to the peripheral region in the pixel row direction is greater than or equal to a length of the first sub-pixel distal from the peripheral region in the pixel row direction, and a length of the first sub-pixel proximal to the peripheral region in the pixel column direction is less than or equal to a length of the first sub-pixel distal from the peripheral region in the pixel column direction.

8. The display substrate according to claim 2, wherein an orthographic projection of the opening formed by the black matrix layer in the region where the each of the first sub-pixels is disposed on the base substrate is within the region where the first sub-pixel is disposed.

9. The display substrate according to claim 1, wherein the pixel electrode is a hollowed-out electrode.

10. The display substrate according to claim 1, wherein the compensation capacitor comprises a first electrode and a second electrode; wherein
the first electrode and the pixel electrode are disposed in a same layer, and the second electrode and a common electrode in the irregularly-shaped sub-pixel are disposed in a same layer; or
the first electrode and a gate electrode in the first sub-pixel are disposed in a same layer, and the second electrode and a source electrode and a drain electrode in the irregularly-shaped sub-pixel are disposed in a same layer.

11. The display substrate according to claim 10, wherein the first electrode and the second electrode are both non-hollowed-out plate electrodes.

12. The display substrate according to claim 2, wherein each of the rectangular pixels comprises a plurality of second sub-pixels; wherein
   each of the second sub-pixels is a rectangular sub-pixel; and
   areas of openings formed by the black matrix layer in regions where the second sub-pixels are respectively disposed are equal.

13. The display substrate according to claim 12, wherein an arrangement direction of the plurality of second sub-pixels is consistent with an arrangement direction of the plurality of first sub-pixels.

14. The display substrate according to claim 1, further comprising a signal line;
   wherein the signal line is connected to each pixel in the display substrate.

15. The display substrate according to claim 14, wherein the signal line comprises a plurality of data lines and a plurality of gate lines;
   wherein each of the data lines is connected to a column of sub-pixels, and each of the gate lines is connected to a row of sub-pixels.

16. The display substrate according to claim 15, wherein at least one of the plurality of data lines is in a bent shape, and at least one of the column of sub-pixels connected to the bent-shaped data lines is an irregularly-shaped sub-pixel.

17. The display substrate according to claim 15, wherein at least one of the plurality of gate lines is in a bent shape, and at least one of the row of sub-pixels connected to the bent-shaped gate lines is an irregularly-shaped sub-pixel.

18. A display device, comprising a driving circuit and a display substrate, wherein
   the display substrate comprises:
      a base substrate, comprising an irregularly-shaped display region and a peripheral region surrounding the irregularly-shaped display region;
      a plurality of rectangular pixels, disposed in the irregularly-shaped display region;
      at least one irregularly-shaped pixel, disposed in the irregularly-shaped display region, wherein the at least one irregularly-shaped pixel is proximal to the peripheral region relative to the rectangular pixel, and a shape of a boundary line of a side, proximal to the peripheral region, of the each irregularly-shaped pixel matches with a shape of a boundary line of the irregularly-shaped display region; and
      a black matrix layer, disposed on a side, distal from the base substrate, of the plurality of rectangular pixels and the at least one irregularly-shaped pixel, wherein an area of an opening formed by the black matrix layer in a region where each of the rectangular pixels is disposed is larger than an area of an opening formed by the black matrix layer in a region where any of the at least one irregularly-shaped pixel is disposed;
   wherein the driving circuit is connected to pixels in the display substrate and configured to supply a driving signal to the pixels,
   wherein the each irregularly-shaped pixel comprises a plurality of first sub-pixels, at least one of the first sub-pixels is an irregularly-shaped sub-pixel;
   each irregularly-shaped sub-pixel comprises a pixel electrode and a compensation capacitor connected to the pixel electrode;
   an orthographic projection of the pixel electrode on the base substrate is within an orthographic projection of the opening formed by the black matrix layer in the region where the first sub-pixel is disposed on the base substrate; and
   an orthographic projection of the compensation capacitor on the base substrate is within a region outside the orthographic projection of the opening formed by the black matrix layer in the region where the irregularly-shaked sub-pixel is disused on the base substrate, and is not overlapped with the orthographic projection of the pixel electrode on the base substrate.

* * * * *